US012794974B2

(12) United States Patent
Zhu et al.

(10) Patent No.: US 12,794,974 B2
(45) Date of Patent: Nov. 10, 2026

(54) RAFT CONSENSUS VICE LEADER OPTIMIZATION

(71) Applicant: Oracle International Corporation, Redwood Shores, CA (US)

(72) Inventors: Ming Zhu, Redwood City, CA (US); David Brower, Alamo, CA (US); Stefan Pommerenk, Hayward, CA (US)

(73) Assignee: Oracle International Corporation, Redwood Shores, CA (US)

( * ) Notice: Subject to any disclaimer, the term of this patent is extended or adjusted under 35 U.S.C. 154(b) by 7 days.

(21) Appl. No.: 18/491,596

(22) Filed: Oct. 20, 2023

(65) Prior Publication Data

US 2025/0133131 A1 Apr. 24, 2025

(51) Int. Cl.
*H04L 67/104* (2022.01)
*G06F 11/20* (2006.01)

(52) U.S. Cl.
CPC ...... *H04L 67/1051* (2013.01); *G06F 11/2028* (2013.01); *H04L 67/1057* (2013.01)

(58) Field of Classification Search
CPC ............. H04L 67/1051; H04L 67/1057; G06F 11/2028
See application file for complete search history.

(56) References Cited

U.S. PATENT DOCUMENTS

2020/0028901 A1* 1/2020 Suresh .................... H04L 41/12
2020/0052954 A1* 2/2020 Han .................... H04L 41/0668
2020/0342456 A1* 10/2020 Krishnaswamy ..... H04L 9/0891
2023/0283663 A1* 9/2023 Rush, Jr. ............... G06F 16/278 709/224
2023/0334930 A1* 10/2023 Qiu ........................ G06Q 40/04

FOREIGN PATENT DOCUMENTS

CN 108810046 A * 11/2018 ......... H04L 67/1051
CN 115277719 A * 11/2022 ......... H04L 67/1051

OTHER PUBLICATIONS

Yeh, T., et al., "Project Report—Byzantine Fault Tolerant Raft," Department of Computer Science & Engineering, Santa Clara University, Santa Clara, CA, date found via Internet Archive as Apr. 15, 2024.

Wang, Y., et al . . . "Analysis of Optimization Ideas of Basic Raft Consensus Algorithm," Santa Clara University, date found via Internet Archive as Apr. 13, 2024.

(Continued)

*Primary Examiner* — Ashish Thomas
*Assistant Examiner* — Bryan P Huang
(74) *Attorney, Agent, or Firm* — Vista IP Law Group, LLP

(57) ABSTRACT

Described is an improved system, method, and computer program product for performing elections in a computing system. Approaches are described for the non-leader member of a member set to self-identify to be the vice-leader. When it detects a death, rather than wait the random, bounded period, the vice-leader can immediately send its "vote for me" message to other members. This puts it ahead of the race by other members to announce their candidacies, and results in vastly more frequent conclusion of the election in the initial round.

21 Claims, 20 Drawing Sheets

(56) References Cited

OTHER PUBLICATIONS

Aariff, D., et al., "Evaluating Performance and Safety of Distributed DNS with RAFT," Santa Clara University, date found via Google as Jul. 5, 2018.
Meng, Q., "Journey to MIT 6.824—Lab 2A RaftLeader Election," Medium, dated Jul. 13, 2021.
Ongaro, D., "Consensus: Bridging Theory and Practice," PhD Dissertation, Stanford University, dated Aug. 2014.
Howard, H., et al., "Paxos vs Raft: Have we reached consensus on distributed consensus?" University of Cambridge, dated Apr. 2020.
"Raft (not)almighty: how to make it more robust," DEV tarantool, URL: https://dev.to/tarantool/raft-notalmighty-how-to-make-it-more-robust-3a11, dated Aug. 8, 2022.
Storti, B., "Raft: Consensus made simple(r)," dated Oct. 12, 2017.
Ongaro, D., et al., "In Search of an Understandable Consensus Algorithm," Proceedings of USENIX ATC '14: 2014 USENIX Annual Technical Conference. Jun. 19-20, 2014.
Kahveci, E., "Today a Raft follower, tomorrow a Raft leader," dated Sep. 8, 2021.
Xu, J., et al., "Raft-PLUS: Improving Raft by Multi-Policy Based Leader Election with Unprejudiced Sorting," symmetry, dated May 2022.
Lin, W., "Uniformly Programmable, Distributed, Reliable, Event-based Systems for Multi-Tier IoT Deployments," PhD Dissertation, University of California Santa Barbara, dated Jun. 2021.
Jalan, S., "Understanding the Raft consensus algorithm: an academic article summary," freeCodeCamp, dated Oct. 11, 2017.

* cited by examiner

Time t2: Standard RAFT protocol – randomized delays for vote requests sent by each node t2-1: Node 104a sends vote request with random delay t2-2: Node 104c sends vote request with random delay t2-3: Node 104b sends vote request with random delay Time t0: currently no leader, simultaneous startup of nodes Time t1: The vice–leader (Node 104c) sends vote requests without delay Time t2: Standard RAFT protocol – randomized delays for vote requests sent by non-vice-leader nodes t2-1: Node 104a sends vote request with random delay t2-2: Node 104b sends vote request with random delay Time t0: Node 102c is the current leader Failure occurs for leader node Node 102c Time t1: The vice-leader (Node 104b) sends vote requests without delay Time t2: Standard RAFT protocol – randomized delays for vote requests sent by non-vice-leader nodes:

t2-1: Node 104a sends vote request with random delay

Time $t_n$: Elect a node as leader (e.g., Node 104b)

RAFT CONSENSUS VICE LEADER OPTIMIZATION

BACKGROUND

Consensus algorithms are a fundamental component of many distributed computing systems. These types of algorithms can be used to allow a group of computing nodes to agree on a common state, even after the occurrence of a failure to one or more of the computing nodes.

One of the most popular consensus algorithms is the RAFT algorithm. RAFT is a consensus algorithm that is designed as an alternative to the Paxos-type algorithms, and can be used to ensure that each computing node in a distributed system can agree upon the same set of state values or state transitions.

However, known RAFT implementations do suffer from some limitations and performance drawbacks. For example, RAFT may take an excessive amount of time to converge on a new leader when the current leader fails. The reason for this delay in electing a new leader is based upon the requirement in RAFT to impose required random delays in the election process when electing a new leader. These delays may result in an inordinate amount of time that is taken to re-elect a new leader after a failure, which could result in significant downtime and latency costs for the overall computing system and the workload that that is supposed to be processed by the system on behalf of users and clients.

Therefore, what is needed is an improved approach to implement elections when using a consensus algorithm that addresses the above-described problems with conventional approaches.

SUMMARY

According to some embodiments, a system, method, and computer program product is provided to perform elections in a distributed computing system. With embodiments of this invention, the non-leader member of a member set can self-identify to be the vice-leader. When it detects a death, rather than wait the random, bounded period described by RAFT, the vice-leader can immediately send its "vote for me" message to other members. This puts it ahead of the race by other members to announce their candidacies, and results in vastly more frequent conclusion of the election in the initial round. There is no prior communication or delegation needed; the vice leader knows its special status by simple, locally visible ordering.

Further details of aspects, objects and advantages of the disclosure are described below in the detailed description, drawings and claims. Both the foregoing general description and the following detailed description are exemplary and explanatory, and are not intended to be limiting as to the scope of the disclosure.

BRIEF DESCRIPTION OF FIGURES

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

As noted above, the RAFT algorithm is well-known for being able to implement elections among elements in a distributed system in a reliable, proven, and correct manner. However, there are some scenarios where the RAFT approach is not optimal.

To explain, consider that conventional RAFT approaches operate by having members detect a potentially failed leader, e.g. based upon a timeout period. Members then wait a random but bounded period and then start leadership elections by broadcasting "vote for me" messages. The election concludes when a given member gets a majority of votes, or there is a timeout causing another random, bounded delay to start the next round of elections. Ultimately this converges and a leader emerges. Much of the time, the member that is first to send the messages will win the election, since this early send of the messages will more likely result in more votes being received for that member, because that member's message will more likely be the first one received by other members.

Figure 1A:
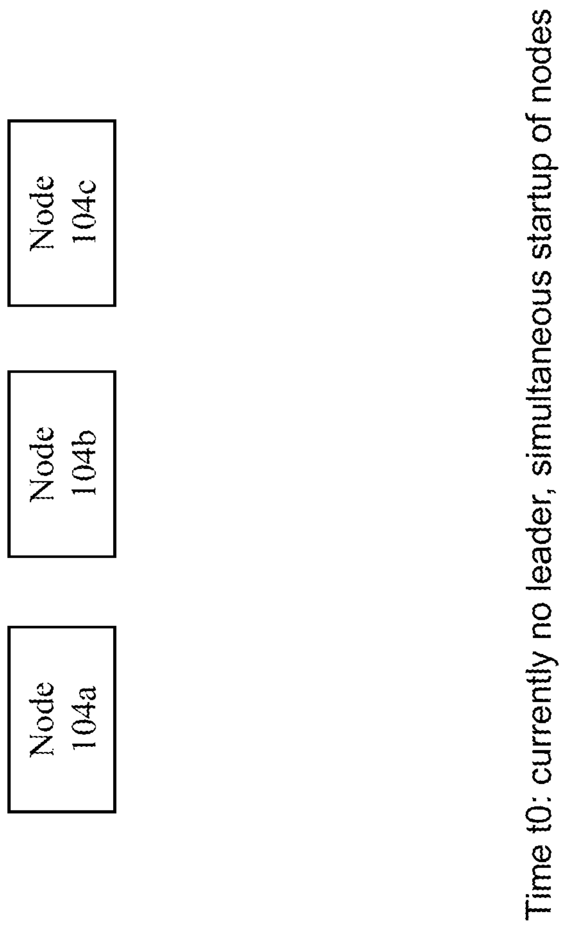
FIGS. 1A-D provide an illustration of a RAFT election with random delays.

This sequence of operations is illustrated in FIGS. 1A-D. FIG. 1A shows three computing nodes 104*a*, 104*b*, and 104*c*. At the current time (to), there is currently no leader, e.g., because the current situation corresponds to a simultaneous startup of computing nodes or where a previous leader node has recently died.

Figure 1B:
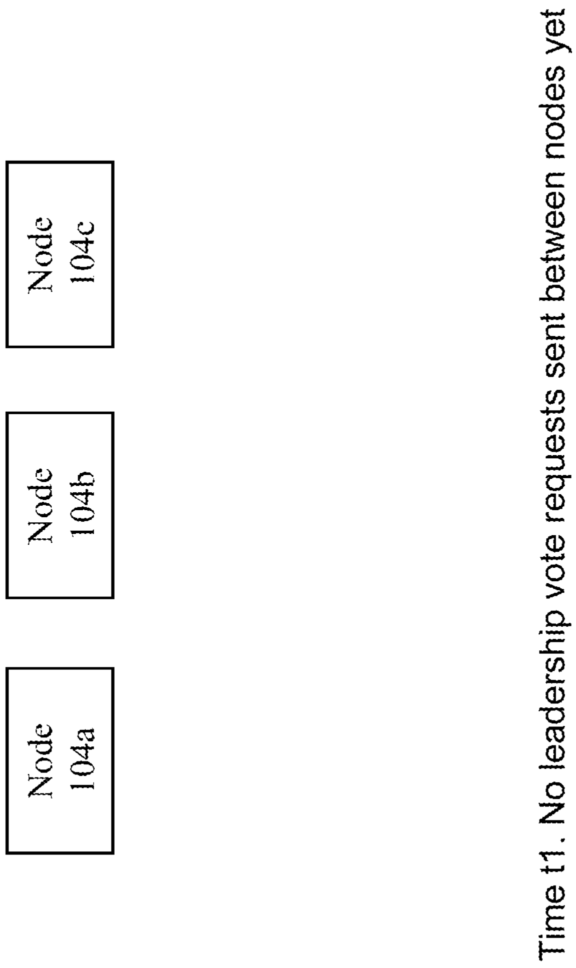

As shown in FIG. 1B, at time t1, no leadership vote requests have yet been sent out by the member nodes 104*a,* 104*b,* and 104*c*. This is because RAFT requires each computing node to wait a certain amount of time before sending out its vote requests.

Figure 1C:
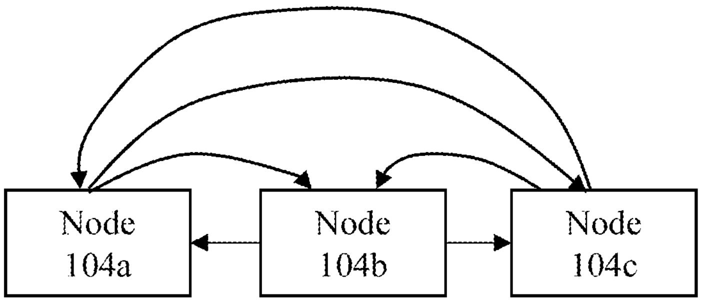

As shown in FIG. 1C, at around time t2, each computing node thereafter sends its vote requests to other noes after the RAFT-imposed random delay period. In the illustrated example, the randomized delay causes computing node 104*a* to send its vote requests at time t2-1, computing node 104*b* to send its vote requests at time t2-2, and computing node 104*c* to send its vote requests at time t2-3.

Figure 1D:
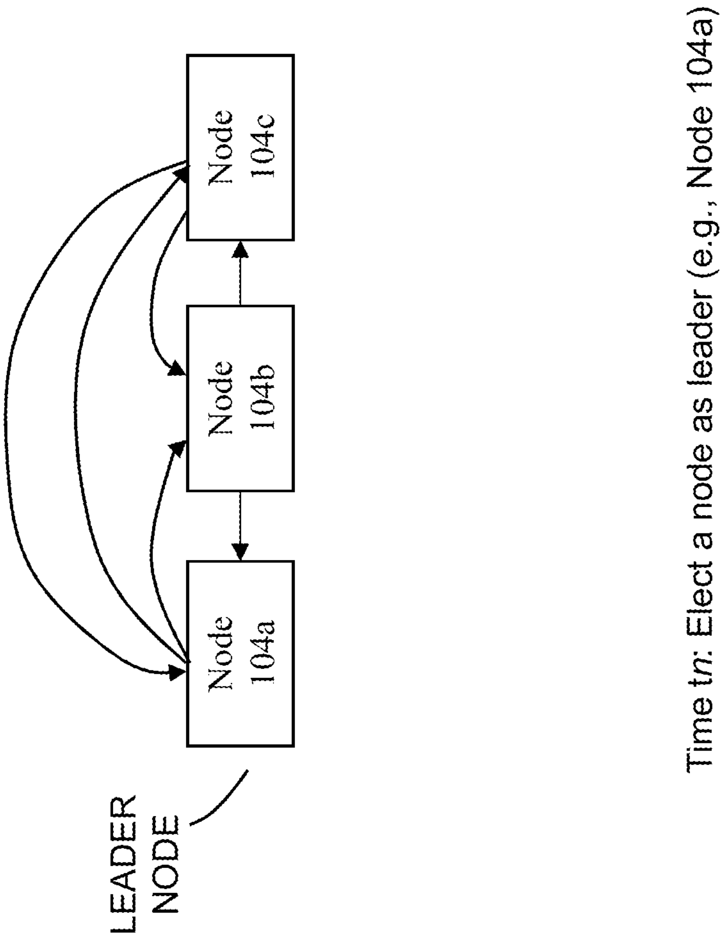

The delay time for each computing node is randomized, so that it is unclear upfront which computing node will be the first to send out its vote requests. The reason for conventional RAFT to require this delay period for each computing node is because of a desire to avoid having multiple computing nodes send their vote requests sent by multiple computing nodes at the exact same time and thereby causing collisions to occur among the requests. By minimizing the likelihood of multiple computing nodes sending requests at the same time, this allows the voting to more likely result in the election of a leader in a given round of elections. As shown in FIG. 1D, the goal is to produce a voting result by time tn that allows a leader to be elected from among the member nodes.

However, there are significant drawbacks to the conventional RAFT approach. For example, when timeouts are short and all members find out about a failure at the same time, the initial round of elections will frequently fail to come up with a winner. In addition, the RAFT-imposed delay period will inevitably create delays to the eventual election of a leader. One possible approach that can be taken is to exploit death detection that is faster than a timeout, where a message transport provides death notification. However, in this case, all members get the notification at nearly the same time, and even with the random delay before sending "vote for me" messages, there is likely to be frequent contention and thus an inconclusive result in the first round of the election.

Embodiments of the invention provide an improved approach to implement a RAFT consensus system, where a biasing action is taken to allow one of the members to be designated as a "vice-leader" to obtain a head-start in elections while avoiding collisions in the first round following a leader failure.

Figure 2:
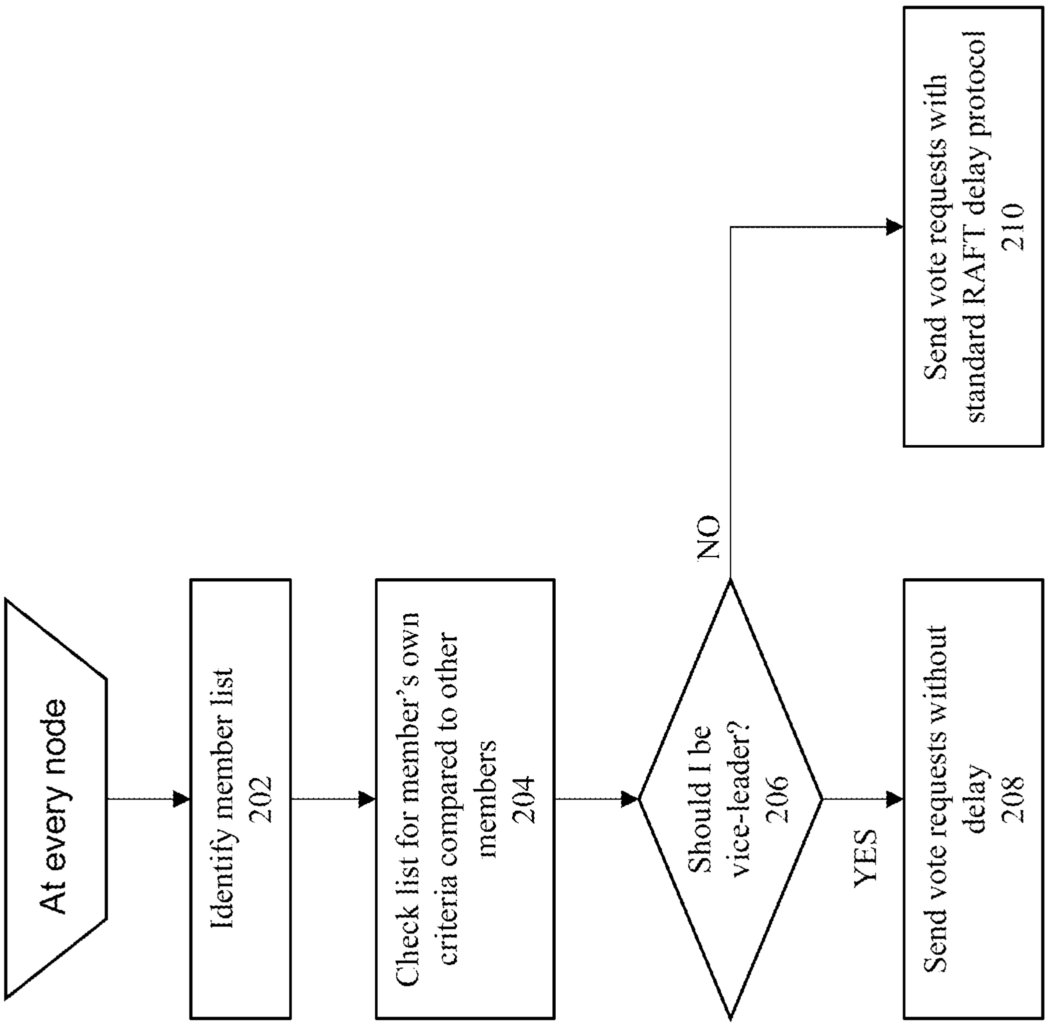
FIG. 2 shows a flowchart of an approach to implement some embodiments of the invention.

FIG. 2 shows a flowchart of an approach to implement some embodiments of the invention. Before describing the individual steps in this flow, it is helpful to point out that in the current embodiment, these flowchart actions are performed individually by each computing node separate from other computing nodes. Each computing node can make its own self-determination in a de-centralized manner. Since all computing nodes operate according to the same determinative algorithm to select a vice-leader, this allows the decentralized nature of the selection process to nonetheless produce a consistent result across every computing node.

At 202, a member list is identified by each computing node to be accessed for the vice-leader selection process. A member list is accessible by each computing node which includes a list of node members. The member list may be created and/or maintained in any suitable manner. For example, the member list may be populated during a system initialization period and subsequently maintained, e.g., based upon actions by an administrator or through an automated process. In some embodiments, each computing node will maintain its own distributed copy of the member list.

In the current embodiment, the member list will also identify a unique identifier for each of the members in the set of voters. For example, each member in the set of voters may be associated with a unique integer identifier, e.g., using a unique identifier such as an IP address or MAC address.

The unique identifier provides a way to distinguish one computing node from another computing node is a determinative manner such that each computing node can be sorted against all other nodes. For example, if each computing node is associated with a unique numerical value that is different from the numerical values of all other nodes, then the member nodes can be consistently sorted according to those values, e.g., to pick either the highest value or the lowest value.

Therefore, at 204, each computing node will check the member list to compare its unique identifier against all other node identifiers. In particular, each computing node will check the list for the member's own vice-leadership selection criteria against the corresponding criteria for other computing nodes. Whichever node determines itself to have the winning criteria, that computing node will at step 206 self-identify as the vice-leader.

For example, assume that the computing node that determines itself to have the highest identifier value will "win" the selection process to be vice-leader. In that case, at 208, that computing node will then take a head-start for the election process by sending its vote requests without undergoing any RAFT delays. In contrast, the computing nodes that do not self-identify as the vice-leader will, at 210, send vote requests according the standard RAFT approach with randomized delays. This approach therefore biases the vice-leader to have a higher likelihood of becoming the newly elected leader.

It is noted that the selected computing node is designated as a vice-leader rather than immediately crowned as the new leader because this process still nonetheless leads into an election process. Even though the vice-leader is given a head start, the uncertainties of any given election process may still result in another computing node becoming the newly elected leader. Therefore, the "vice" portion of the "vice-leader" designation merely designates the bias that is given rather than any specific guarantee of the computing node being elected leader, although the head start will in most cases provide an overwhelming advantage that results in the vice-leader becoming the new leader.

Figure 3A:
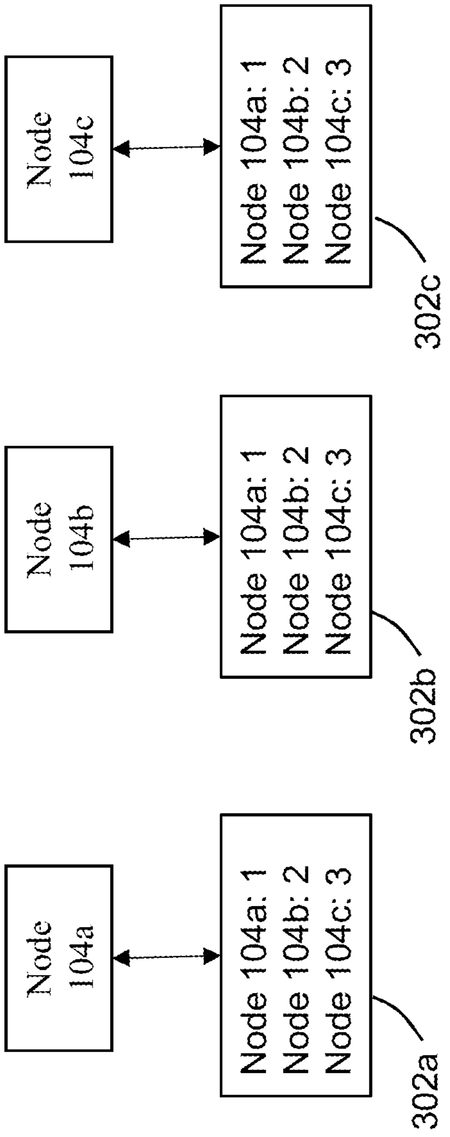
FIGS. 3A-E provide an illustration of the process of FIG. 2.

FIGS. 3A-E provide an illustration of this process. As before, FIG. 3A shows three computing nodes 104*a,* 104*b,* and 104*c*. At the current time (to), there is currently no leader, e.g., because the current situation corresponds to a simultaneous startup of computing nodes or where a previous leader node has recently died.

Each computing node 104*a-c* has access to a corresponding/respective member list 302*a-c,* that includes the same list of all voting members. Here, the member list includes a listing of Node 104*a,* Node 104*b,* and Node 104*c*. Each member in the list is associated with a unique identifier. Specifically, Node 104*a* is associated with unique identifier "1", Node 104*b* is associated with unique identifier "2", and Node 104*c* is associated with unique identifier "3".

Figure 3B:
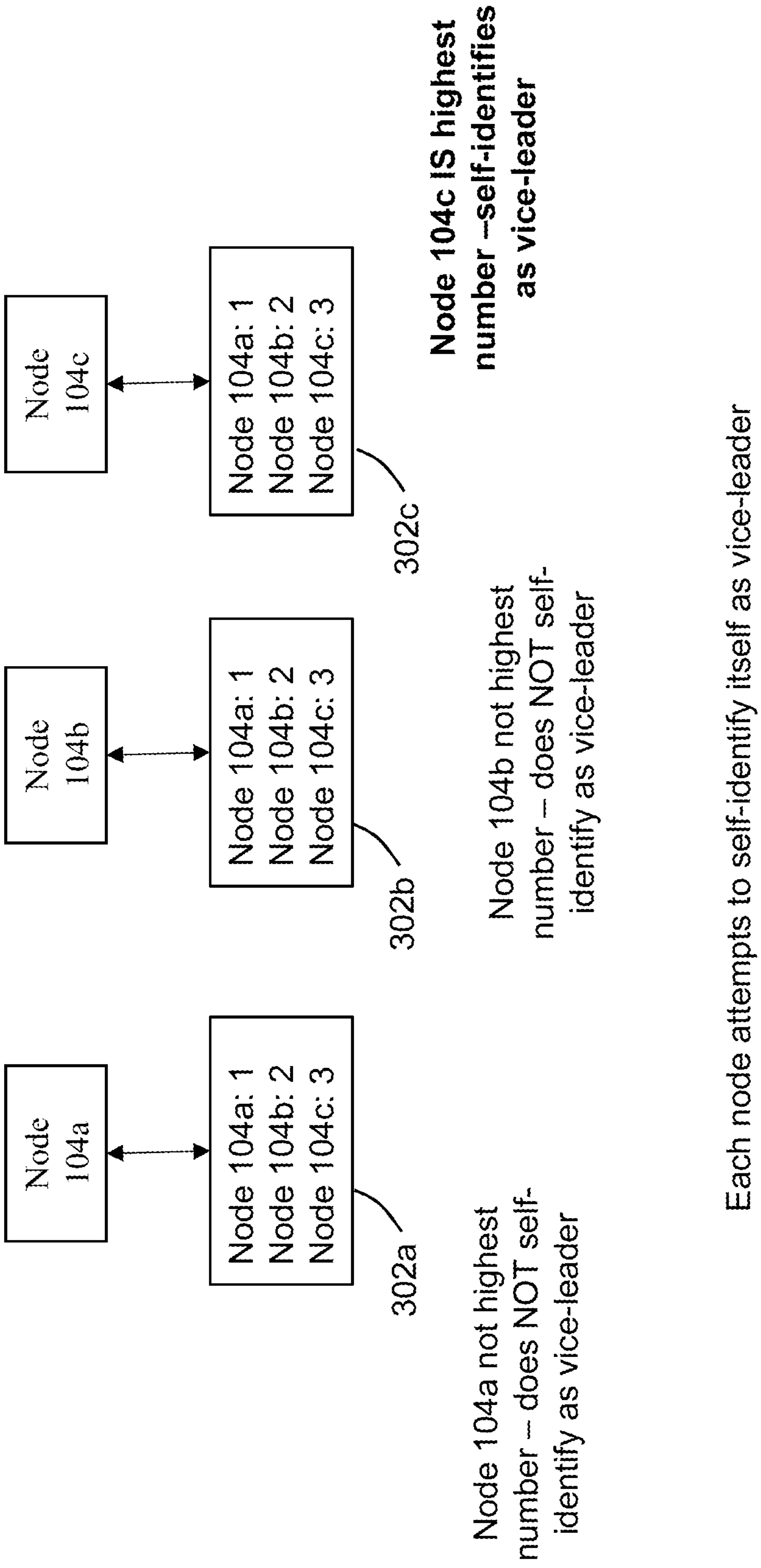

FIG. 3B provides an illustration of the self-determination that is made by each computing node as to whether that computing node is to be the vice-leader. Assume for the sake of explanation that the criteria to be the vice-leader is to have the highest value for the unique identifier. In the current example, it can be seen that Node 104*c* is associated with the highest unique identifier value of "3", which is higher than the "1" value associated with Node 104*a*, and the "2" value associated with Node 104*b*.

Since each computing node has its own access to the same member list that shows this information, this means that each computing node can make this determination itself in a consistent way relative to each other node whether that computing node has the highest unique value. As such, each computing node can make a self-determination whether it is the vice leader node.

Here, Node 104*a* and Node 104*b* each will make a self-determination that it does not have the highest unique identifier value, and hence cannot be the vice-leader. However, Node 104*c* will be able to determine that it is associated with the highest unique identifier value, and hence will self-identify as the vice-leader.

Figure 3C:
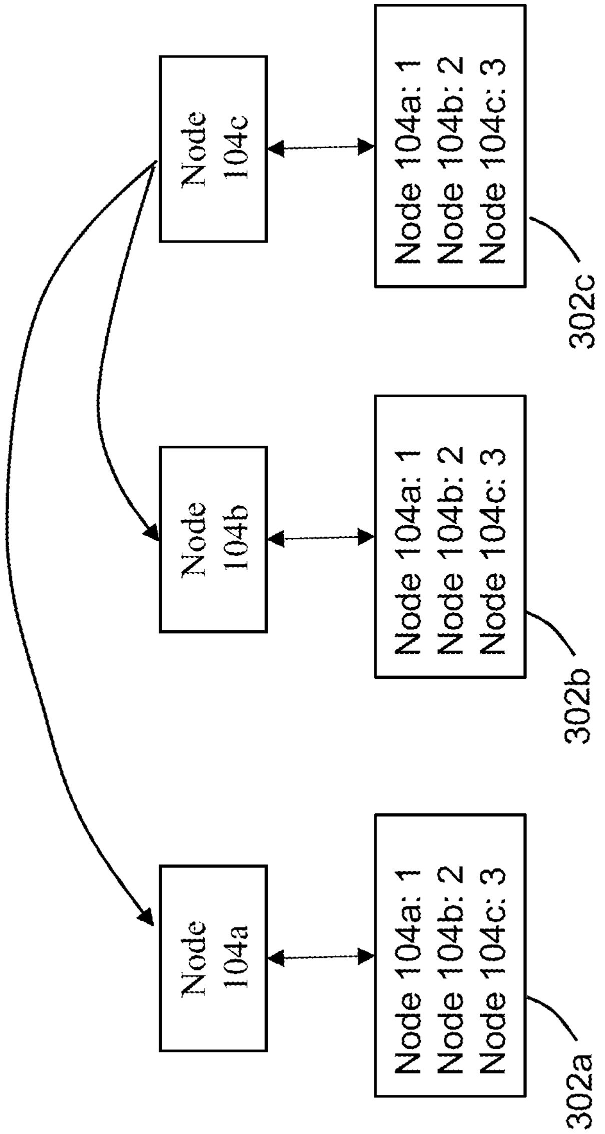

As shown in FIG. 3C, this self-designation of Node 104*c* as the vice-leader allows this computing node at time t1 to send its "vote for me" requests to the other computing nodes without any RAFT-imposed delay. This permits Node 104*c* to get a head start to get its vote requests to the other computing nodes before any other node has yet had a chance to send its own vote requests. This head start makes it much more likely that this node will receive a vote from a peer member to be the leader (since the "vote for me" message from Node 104*c* will more likely be received at a peer node before any other such messages from other nodes), especially in a first round of voting.

Figure 3D:
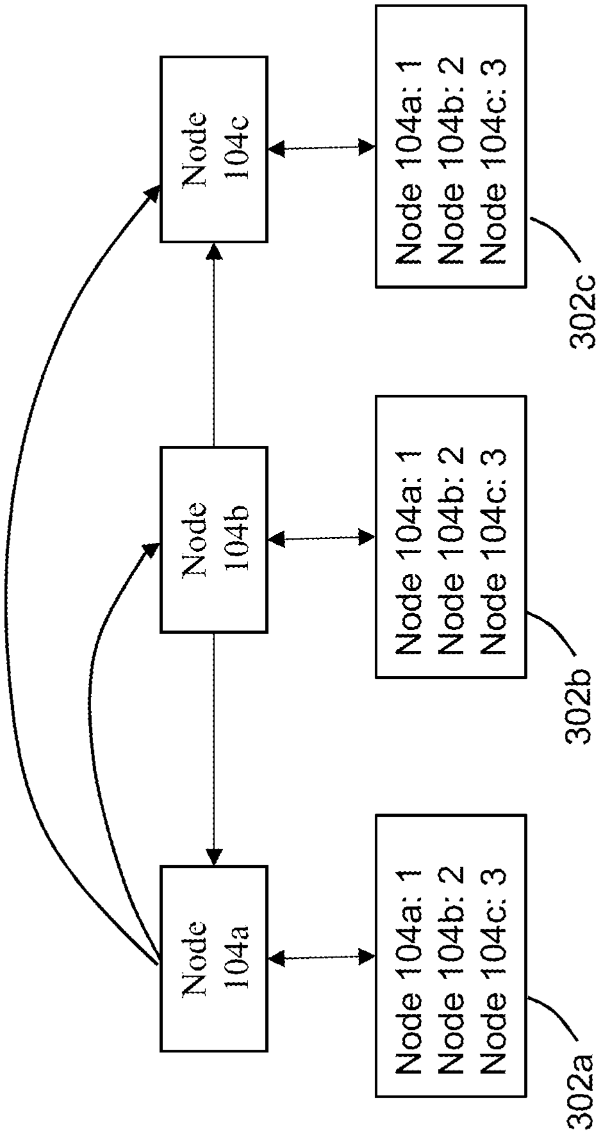

As shown in FIG. 3D, only later at time t2 will the other computing nodes be able to send their own vote requests to the other computing nodes. Since these other computing nodes are not the vice-leader, these other computing nodes will need to wait the RAFT-required delay period before sending out vote requests. In the illustrated example, the randomized delay causes Node 104*a* to send its vote requests at time t2-1 and Node 104*b* to send its vote requests at time t2-2.

Figure 3E:
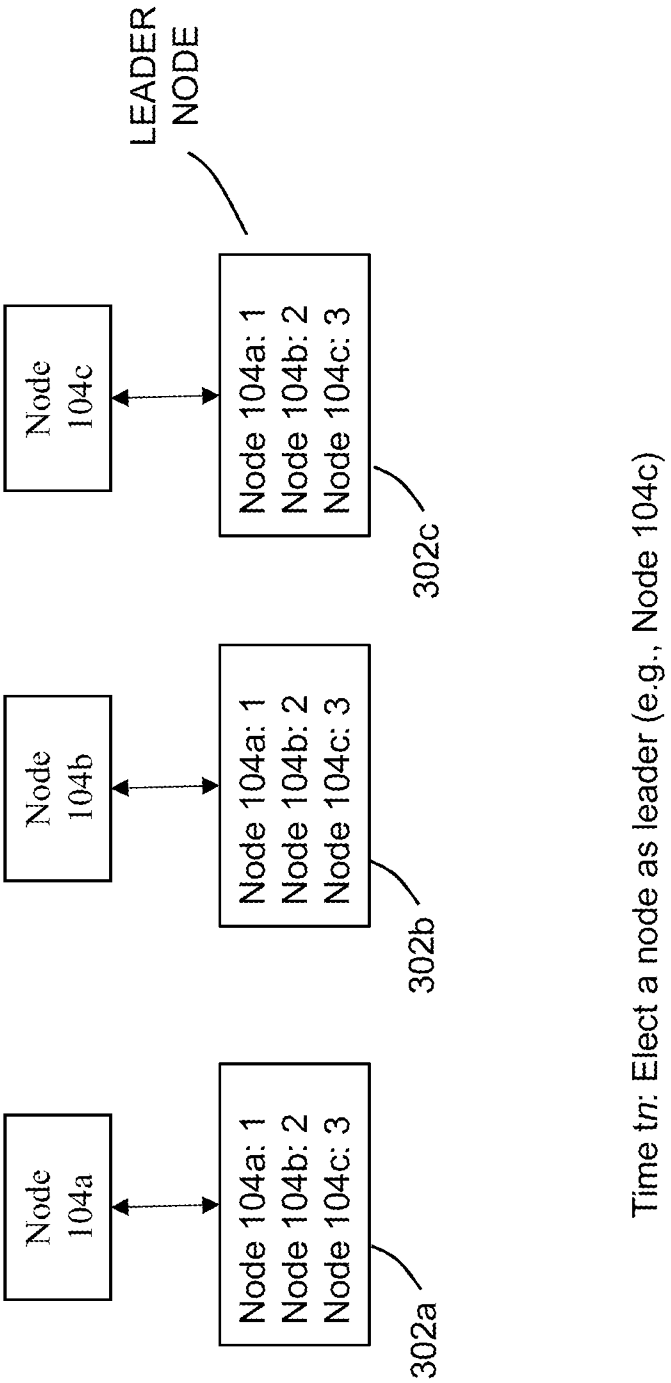

The result of this is that the vice-leader Node 104*c* is given an incredibly large advantage for the election process to become the new leader, since its vote requests will likely be received before any other vote requests by other nodes. As such, as shown in FIG. 3E, it is very likely that by time tn, the vice-leader Node 104*c* will be elected as the new leader node.

Any approach can be to determine the change of conditions under which it is decided that a new leader needs to be elected. For example, as previously mentioned, a timeout period can be established whereby a failure to have communications processed and/or responded to by a given node will give an indication that the computing node is no longer available. In addition, some embodiments may also look at the connection/channel status of a given node to identify whether that computing node is available. This indication of communication/channel status can also be used in the process to select a vice-leader.

Figure 4:
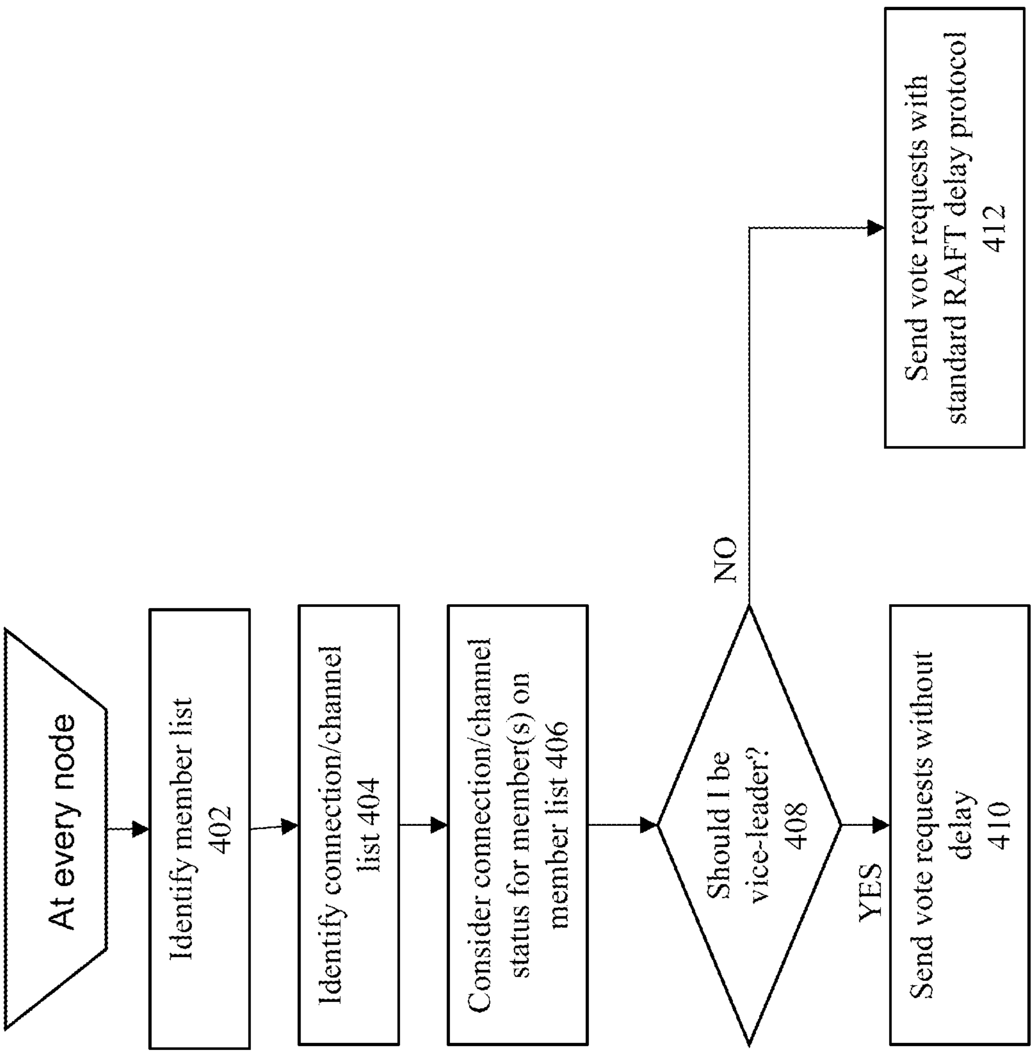
FIG. 4 shows a flowchart of an approach to implement an additional embodiment.

FIG. 4 shows a flowchart of an approach to implement this additional embodiment. As before, at 402, a member list is maintained which includes a list of node members that are eligible for voting. The member list will also include a unique identifier for each of the members in the set of voters. For example, each member in the set of voters may be associated with a unique numerical, alphabetic, or mixed number-letter identifier. As discussed above, the unique identifier provides a way to distinguish one node from another node is a determinative manner such that each computing node can be sorted against all other computing nodes.

In addition, at 404, each computing node will also have access to a connection/channel list that identifies the current communications status of that computing node relative to the other computing nodes. The general idea is that this list can be used to track all other computing nodes with respect to their ability to communicate with a given computing node. In this way, when a computing node looking at the member list to decide if it should self-identify itself as the vice-leader, this permits the computing node to exclude or filter out any other computing nodes that are likely not to be viable or active computing nodes.

At 406, the connection/channel status for the other computing nodes are considered for the vice-leadership analysis. For example, this can be implemented by, at each occurrence of a message receipt or a system tick, checking the current connection/channel states and making a determination whether the connection/channel list should be updated with a new status. For instance, when messages are exchanged between computing nodes, the failure to see such messages being exchanged will provide the indication of a channel failure. Even in the presence of light workloads, these indications can be obtained by sending regular "dummy" messages to check the status of a given channel.

Based upon these status indications in the various lists, a more precise determination can be made at 408 whether the computing node should self-identify as the vice-leader node. For example, if the current leader is the ordering winner of the voting set, and its connection remains viable, then no vice-leader needs to be selected. However, if the current leader is the ordering leader but its channel has been marked dead, then another surviving member would need to be selected as the new leader. The communication channel state would be considered as part of the determination whether to self-identify a computing node as the vice leader node. Therefore, when channel states are all good, then only the ordering winner is considered as the vice-leader node. When there are bad channel states, then members associated with the bad channel states can be discarded from the consideration of the sorting winner.

When a computing node has self-determined itself to be the vice-leader based upon the above-described criteria for the unique identifier and channel status, then at 410, that computing node will send its vote requests without undergoing any RAFT-imposed delays. However, for computing nodes that do not self-identify as the vice-leader, at 412 that computing node will send its vote requests according the standard RAFT approach with randomized delays.

Figure 5A:
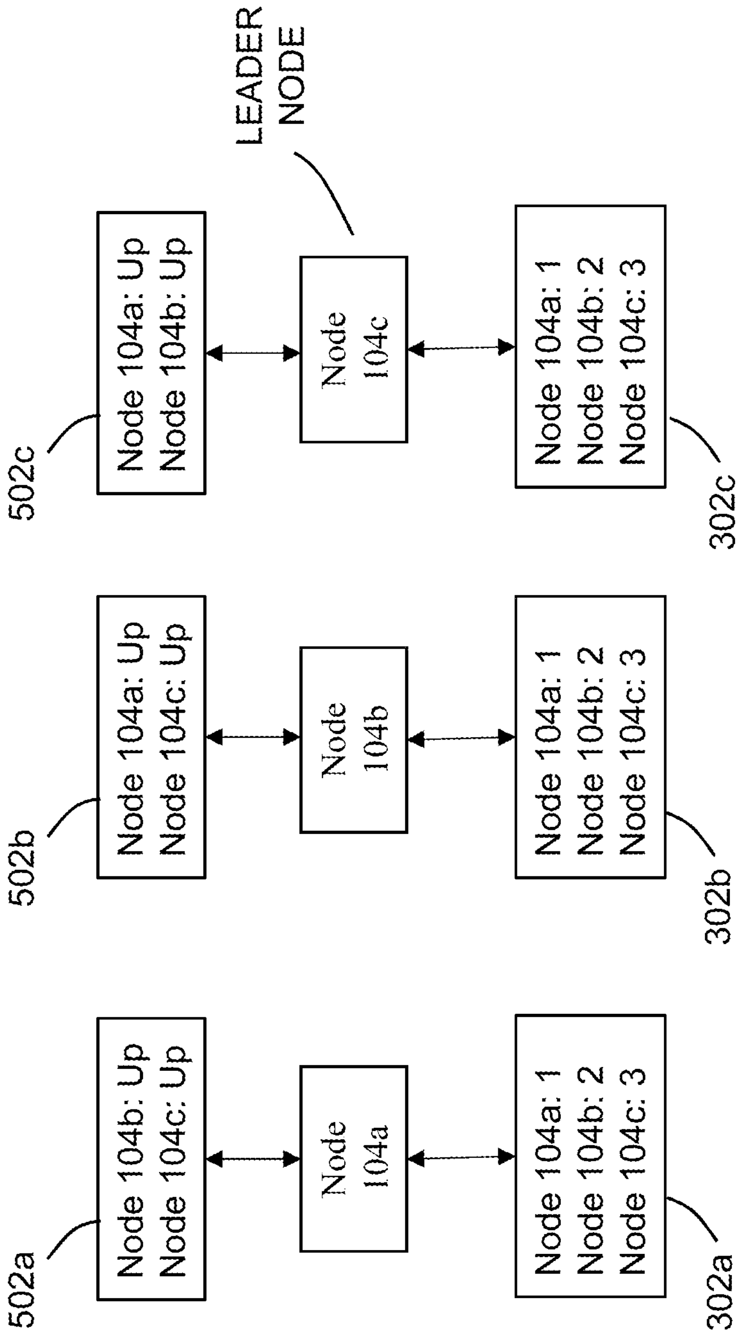
FIGS. 5A-F provide an illustration of the process of FIG. 4.

FIGS. 5A-E provide an illustration of this process. FIG. 5A shows three nodes 104*a*, 104*b*, and 104*c*, where at the current time (to), Node 104*c* is identified as the current leader node.

Each node 104*a*-*c* has access to a corresponding/respective member list 302*a*-*c*, that includes a list of all voting members. Here, the member list includes a listing of Node 104*a*, Node 104*b*, and Node 104*c*. Each member in the list is associated with a unique identifier. Specifically, Node 104*a* is associated with unique identifier "1", Node 104*b* is associated with unique identifier "2", and Node 104*c* is associated with unique identifier "3".

In addition, each node 104*a*-*c* has access to a corresponding/respective comm/channel status list 502*a*-*c*, that includes a status indication for each other computing node in the voting list. Any suitable type or extent of status indication may be maintained in the lists 502*a*-*c*. For the sake of explanation, the current illustrative embodiment includes an "Up" status to indicate that the communication channel between a given node and another node is good, but includes a "Down" status to indicate that the communication channel between the given node and the other node is not good. At the current time, each node enjoys good communications with all other nodes. Therefore, the status indicators in the lists 502*a-c* are provide an indication of "Up".

Figure 5B:
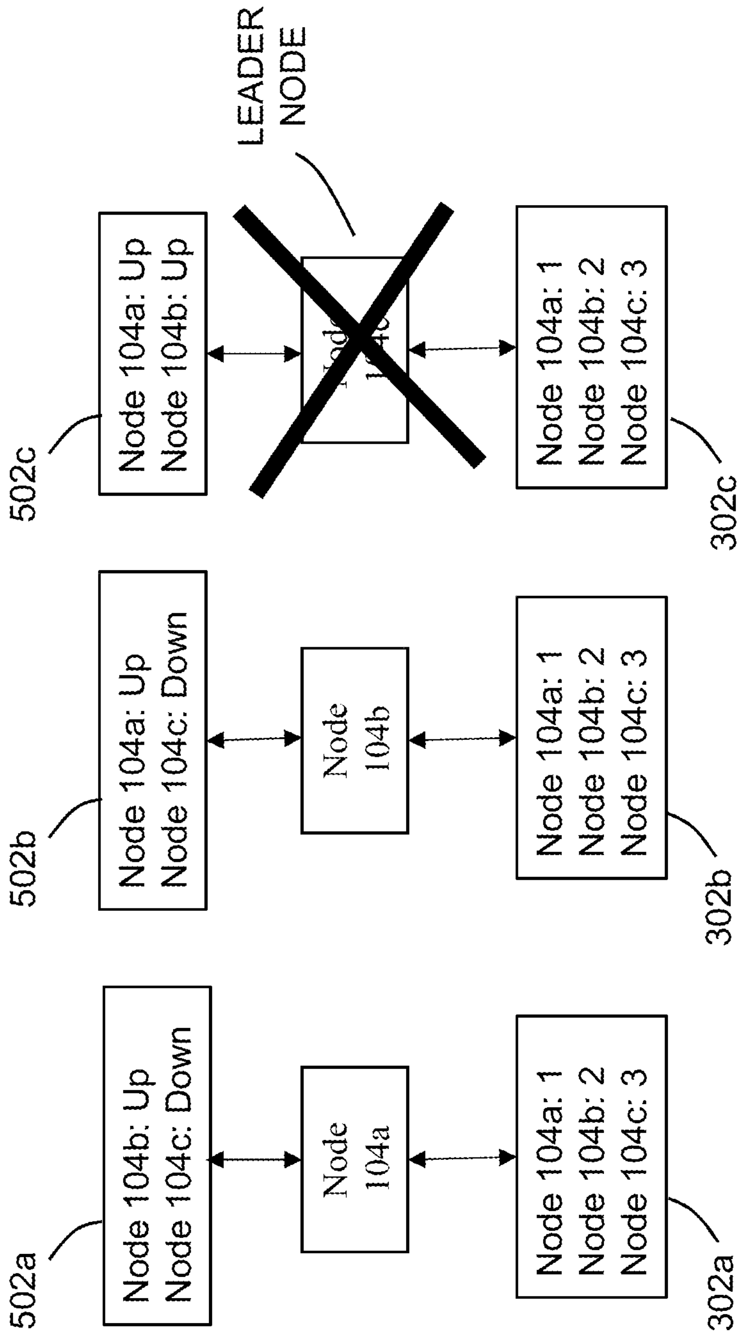

Consider if a failure occurs at the leader node such that communications no longer operate correctly between the current leader node 104*c* and the other nodes. This may occur because the leader as entirely failed or crashed. In addition, this may occur because the leader node did not entirely crash, but did suffer enough problems such that a TCP reset is performed on that computing node. As shown in FIG. 5B, this results in the connection/channel list 302*a* and 302*b* maintained by Nodes 104*a* and 104*b*, respectively, to change its status indicator for current leader Node 103*c* to have the "Down" status.

Figure 5C:
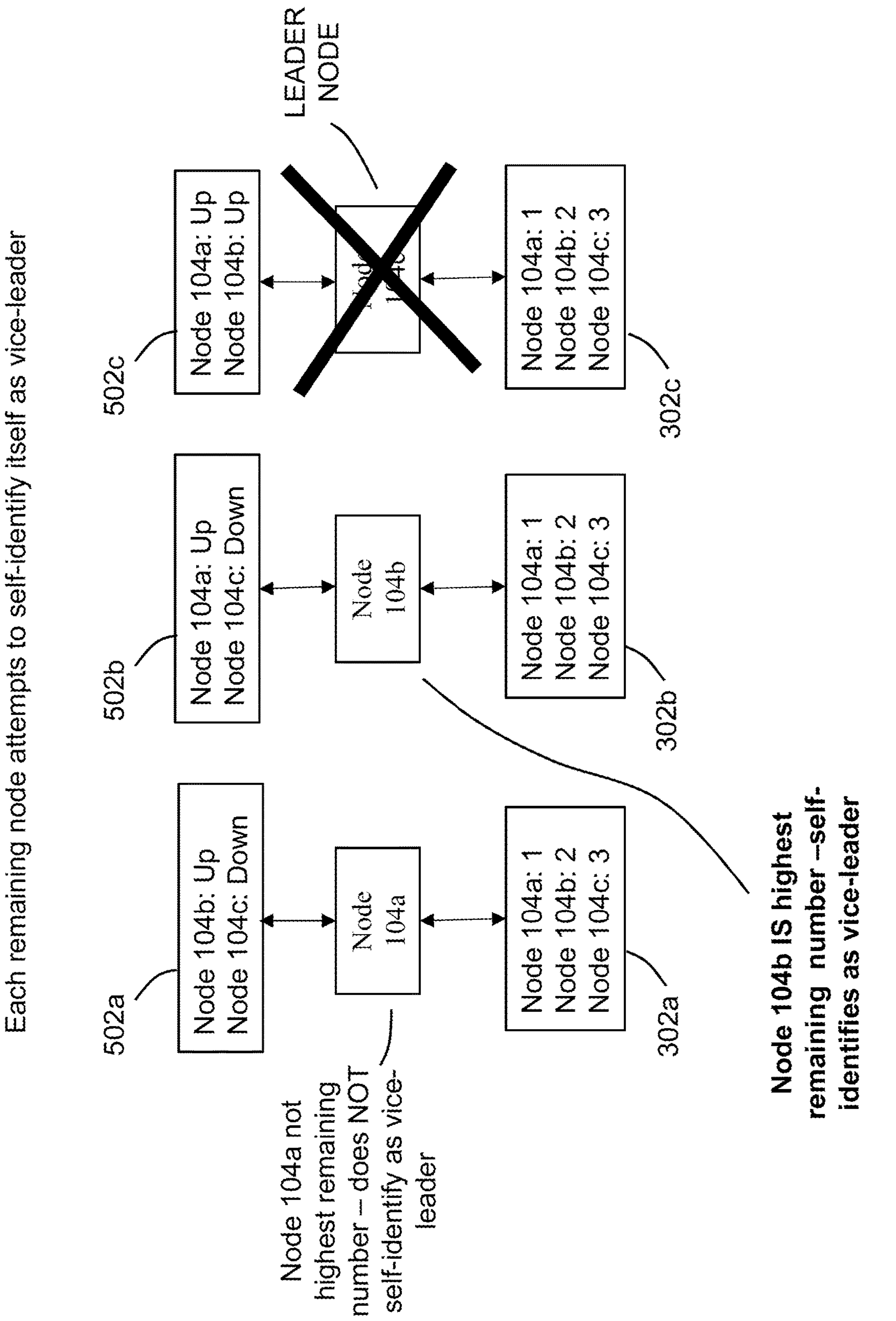

As shown in FIG. 5C, a self-determination that is subsequently made by each surviving Node 104*a* and 104*b* will use the information in both the member list 302*a-b* and the connection/channel status list 502*a-b* to make the determination which of the computing nodes is to be the vice-leader.

As before, assume for the sake of explanation that the criteria to be the vice-leader is to have the highest value for the unique identifier. In the current example, it can be seen from just looking at the member lists that Node 104*c* is associated with the highest unique identifier value of "3", which is higher than the "1" value associated with Node 104*a*, and the "2" value associated with Node 104*b*.

However, the connection/channel status lists identify Node 104*c* as having the "Down" status. Therefore, even though Node 104*c* has the highest sorted unique identifier value, this computing node is excluded from consideration because of its connection/channel status being "Down".

Figure 5D:
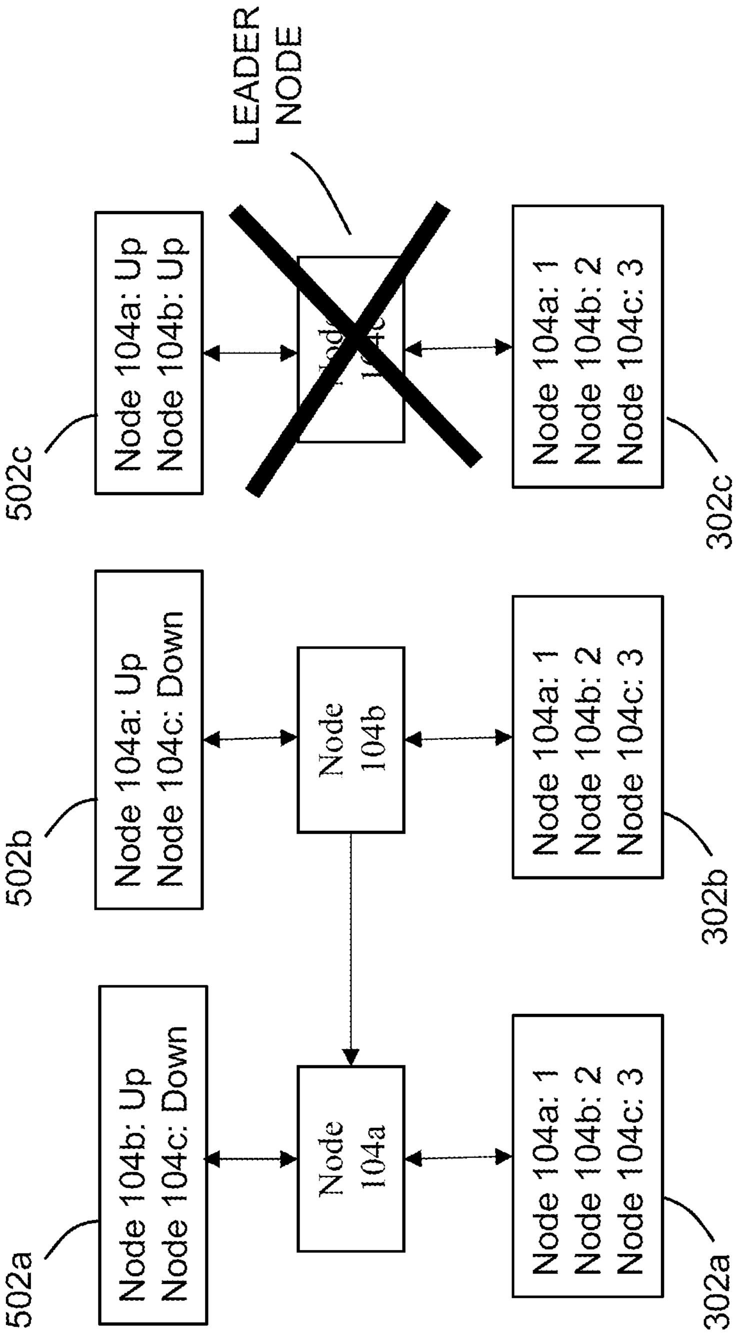

As a result, when Node 104*a* and Node 104*b* each make its own self-determination, Node 104*b* will now be able to determine that it is associated with the highest remaining unique identifier value, and hence will self-identify as the vice leader. As shown in FIG. 5D, this self-designation of Node 104*b* as the vice-leader allows this node at time t1 to send its "vote for me" requests to the other computing nodes without any RAFT-imposed delay. This permits Node 104*b* to get a head start and gets its vote requests to the other computing nodes before any other computing node has yet had a chance to send its own vote requests.

Figure 5E:
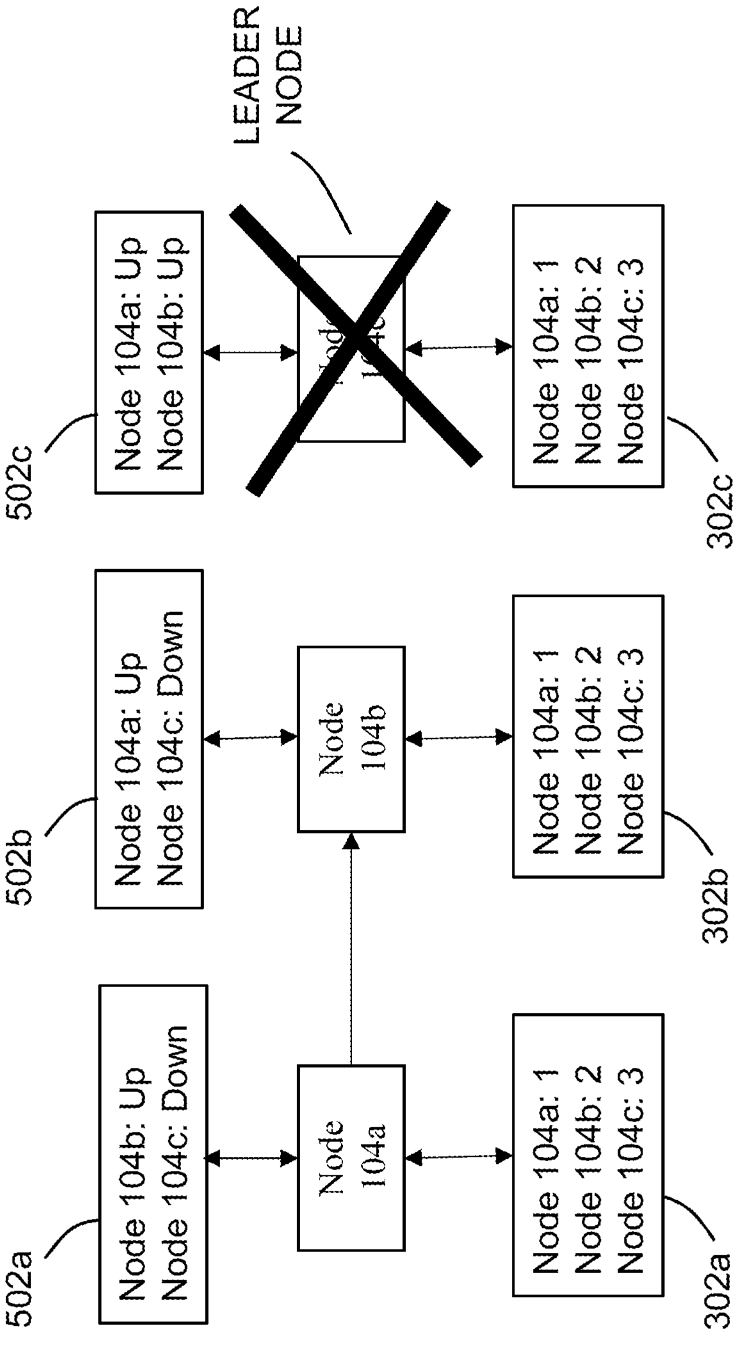

As shown in FIG. 5E, at time t2, the other remaining computing nodes (e.g., Node 104*a*) will be able to start sending their own vote requests to the other nodes. Since Node 104*a* is not the vice-leader, this computing node will need to wait the RAFT-required delay period before sending out its vote requests. In the illustrated example, the randomized delay causes Node 104*a* to send its vote requests at time t2-1.

Figure 5F:
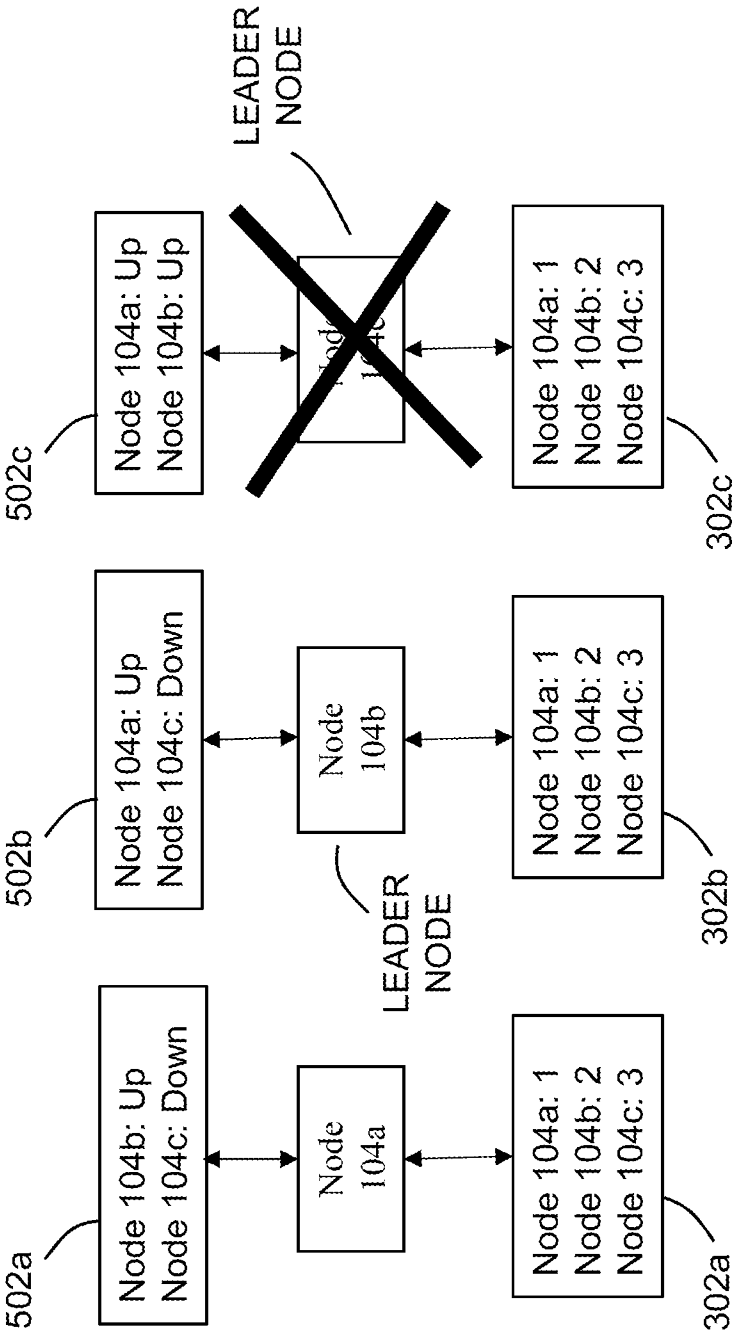

Since the vice-leader Node 104*b* is given the head start in the election process to become the new leader, its vote requests will likely be received before any other vote requests by other computing nodes. As such, as shown in FIG. 5F, it is very likely that by time tn, the vice-leader Node 104*b* will be elected as the new leader node.

This process may operate differently upon a cold start. In this situation, the communication channels may not have been established yet between the computing nodes. As such, the connection/channel status indications will all have a "Down" indication between each of the computing nodes. In this situation, the status indicators cannot be relied upon to filter out any of the computing nodes from being the vice-leader. Indeed, in this situation, if every other computing node is excluded from consideration, then the above algorithm may cause every computing node to end up self-identifying as the vice leader. Therefore, in such as cold start scenario (or any other scenario where the connection/channel status may not be relied upon), then the system can default to standard RAFT processing without the designation of a vice-leader.

It is noted that the self-determination of a vice-leader need not occur only at the time of an identified failure. Instead, in some embodiments, each member can constantly make a determination to decide if it is the vice-leader. This permits the computing node to be immediately ready in case of an upcoming election. There are times when no member is a vice-leader, e.g., when the ordering winner is currently still alive and has already been elected/designated as the leader. In this case, the ordering winner is its own vice-leader, which devolves into its current role as the leader.

One additional point to mention is that the preference of a sorted ordering winner may result in the consistent indication of either the highest ordered member or the lowest ordered member (depending on which direction is selected) to always be the winner every time. This may have a negative effect in certain circumstances. For example, the always-selected node may incur higher levels of wear and tear on its components compared to other nodes, causing a greater likelihood of early component failures.

One way to address this is use an algorithm that rotates the selection of a winner on a changeable basis, e.g., where the selection algorithm changes its selection based upon some changeable aspect to create a tuple or hash of, for example, the computing node's unique identifier with some other changeable value. This would cause a coordinated rotation of the "winner" to occur on a regular basis.

Another possible issue with the above algorithm is that the use of a sorted order may select a computing node that is less-suited to be the leader despite the computing node having either the highest or lowest sorted identifier value, e.g., because that computing node has relatively lower levels of resources to handle being the leader.

Some embodiments can address this issue by using a discriminant value in combination with the computing node's unique identifier to select the vice-leader. The discriminant value may correspond to any factor or set of factors that are deemed worthy of consideration for selecting the vice-leader. Examples of such discriminant values may include, for example, the available CPU, memory, or network resources on a given computing node. The discriminant value may be used as a weighting factor, or as another sorting list from which to select the vice-leader.

Figure 6:
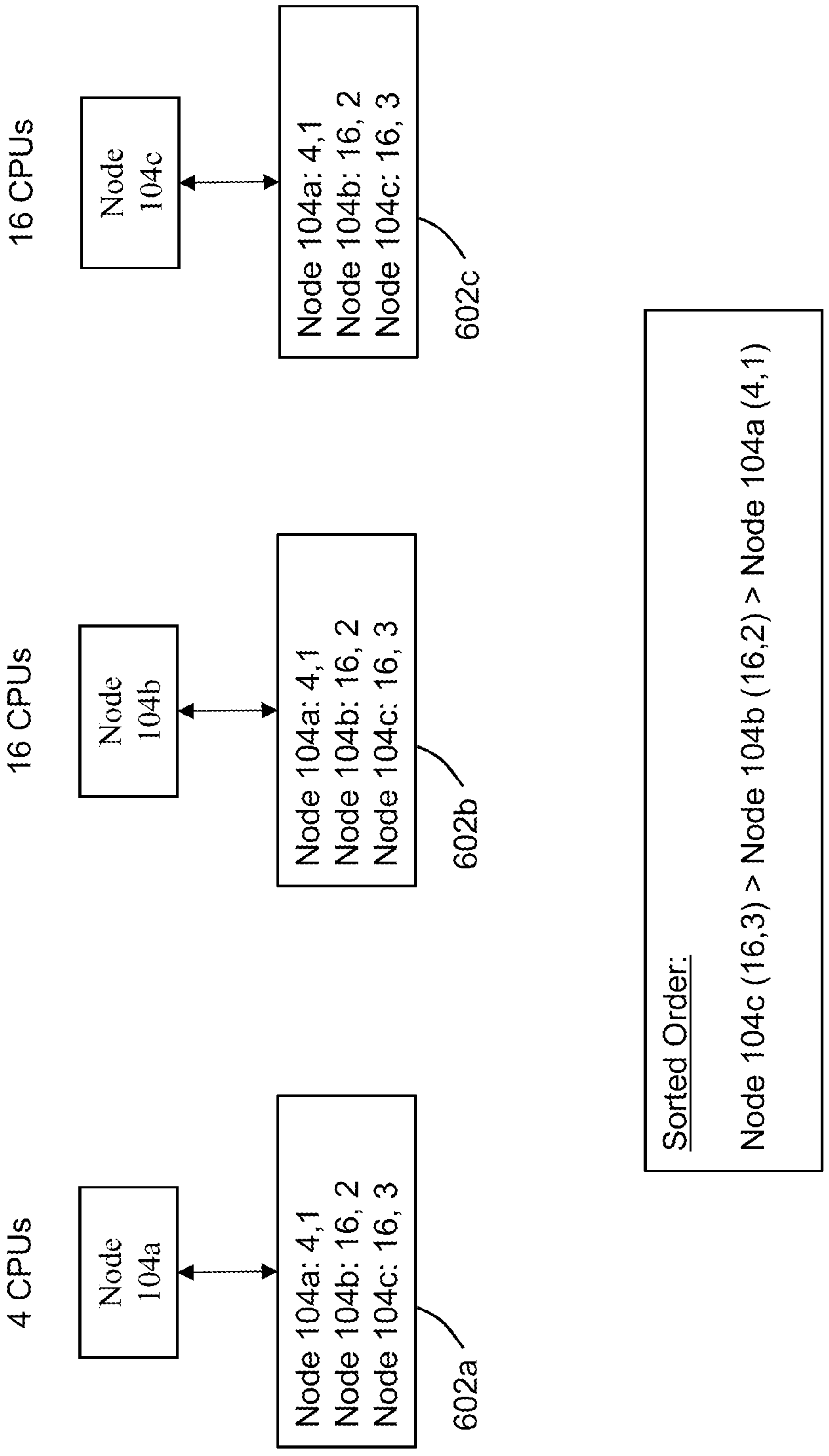
FIG. 6 provides an illustration of an approach to use additional discriminant values to sort members.

FIG. 6 provides an illustration of this approach. In this example, each of the Nodes 104*a*, 104*b*, and 104*c* may corresponds to differences in their CPU capabilities. Here, Node 104*a* only provides 4 CPUs, whereas Nodes 104*b* and 104*c* each include 16 CPUs.

The sorting order of these computing nodes can be considered as a two-part sorting order. In particular, the CPU capacity value can be used to perform an initial sort of the computing nodes, where the computing node having the highest CPU capacity is deemed the sorting winner. If there are any ties after the first round of sorting, then additional criteria are applied until a winner is identified. For example, additional levels of sorting may be applied for memory capacity, network capacity, etc. The simple example of FIG. 6 shows a first round of sorting based upon the CPU capacity which identifies both Node 104*b* and 104*c* as having the highest CPU capacities (16 CPUs). The next round of sorting shown in this figure is to use the computing node's unique identifier as the tie breaker. In the current example where both Node 104*b* and 104*c* are tied with 16 CPUs in the first round of sorting, the fact that Node 104*c* has a higher unique identifier value of "3" compared the identifier value of "2" for Node 104*b* means that Node 104*c* is identified as the sorting winner, and thus will be self-determined to be the vice-leader in this group of member nodes.

The present invention may be used in any context in which there is a desire to implement an improved RAFT process. For example, the current invention is particularly well suited to be used in database clustering system. A database clustering system allows the underlying servers within the computing infrastructure to communicate with each other so that they appear to function as a collective unit. Although the servers may be configured as standalone servers, each server has additional processes that communicate with other servers and where the different servers may access a shared/common set of database storage objects. The clustered database system therefore contains a shared architecture in which multiple running instances can each be used to manage a set of shared physical data files. Each of the database instances resides on a separate host and forms its own set of background processes and memory buffers, but in which the cluster infrastructure allows access to a single shared database via multiple database instances. In this way, the separate servers (e.g., computing nodes) appear as if they are one system to applications and end users.

In order for the database cluster to operate properly, these servers (e.g., computing nodes) will need to be able to communicate with one another in order to perform work. The database cluster as a whole cannot work properly if there is a breakdown of communications between the computing nodes. For example, many aspects of cluster interactions (e.g., lock management, cluster management, and status updates) cannot function properly if one or more nodes in the cluster are unable to communicate with the other nodes.

When a breakdown in communications occurs, there is often the need to identify which of the surviving nodes has been or should be designated as the "master" or "leader" node. To explain, consider the situation of a multi-node cluster that experiences a communications failure. In this situation, the nodes in the cluster will be unable to communicate with each other, and hence it would not be feasible to allow each node to continue operating independently of the other nodes since this may result in inconsistent data changes being applied by each node. Therefore, a leadership election according to the current embodiments may be performed to identify a specific master node to initiate a reconfiguration of the cluster or to maintain consistency of data within the system.

Therefore, what has been disclosed is an improved approach for performing elections in a database cluster. With embodiments of this invention, the non-leader member of a member set can self-identify to be the vice-leader. When it detects a death, rather than wait the random, bounded period described by RAFT, the vice-leader can immediately send its "vote for me" message to other members. This puts it ahead of the race by other members to announce their candidacies, and results in vastly more frequent conclusion of the election in the initial round. There is no prior communication or delegation needed; the vice leader knows its special status by simple, locally visible ordering.

SYSTEM ARCHITECTURE OVERVIEW

Figure 7:
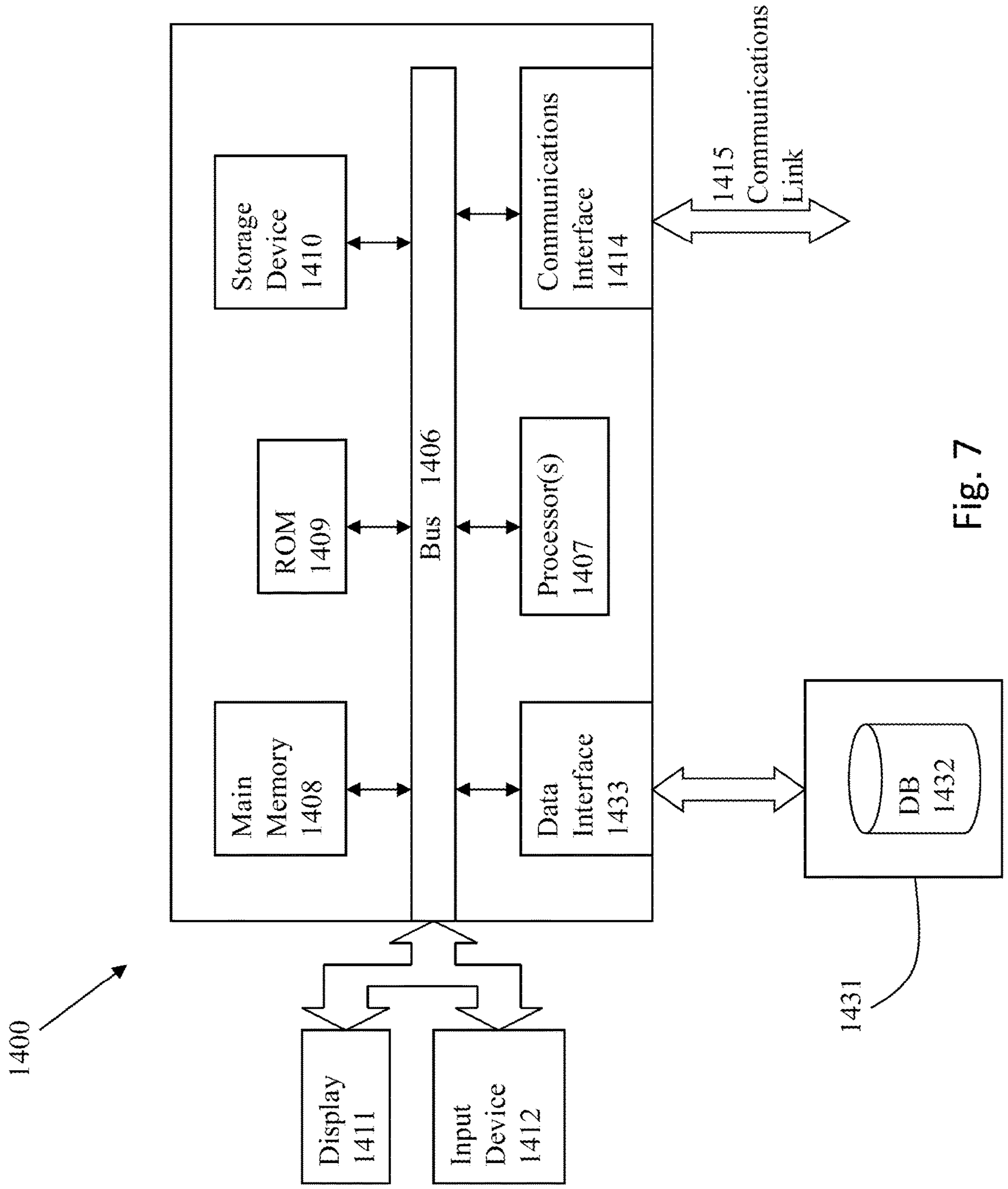
FIG. 7 is a block diagram of an illustrative computing system suitable for implementing an embodiment of the present disclosure.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 8:
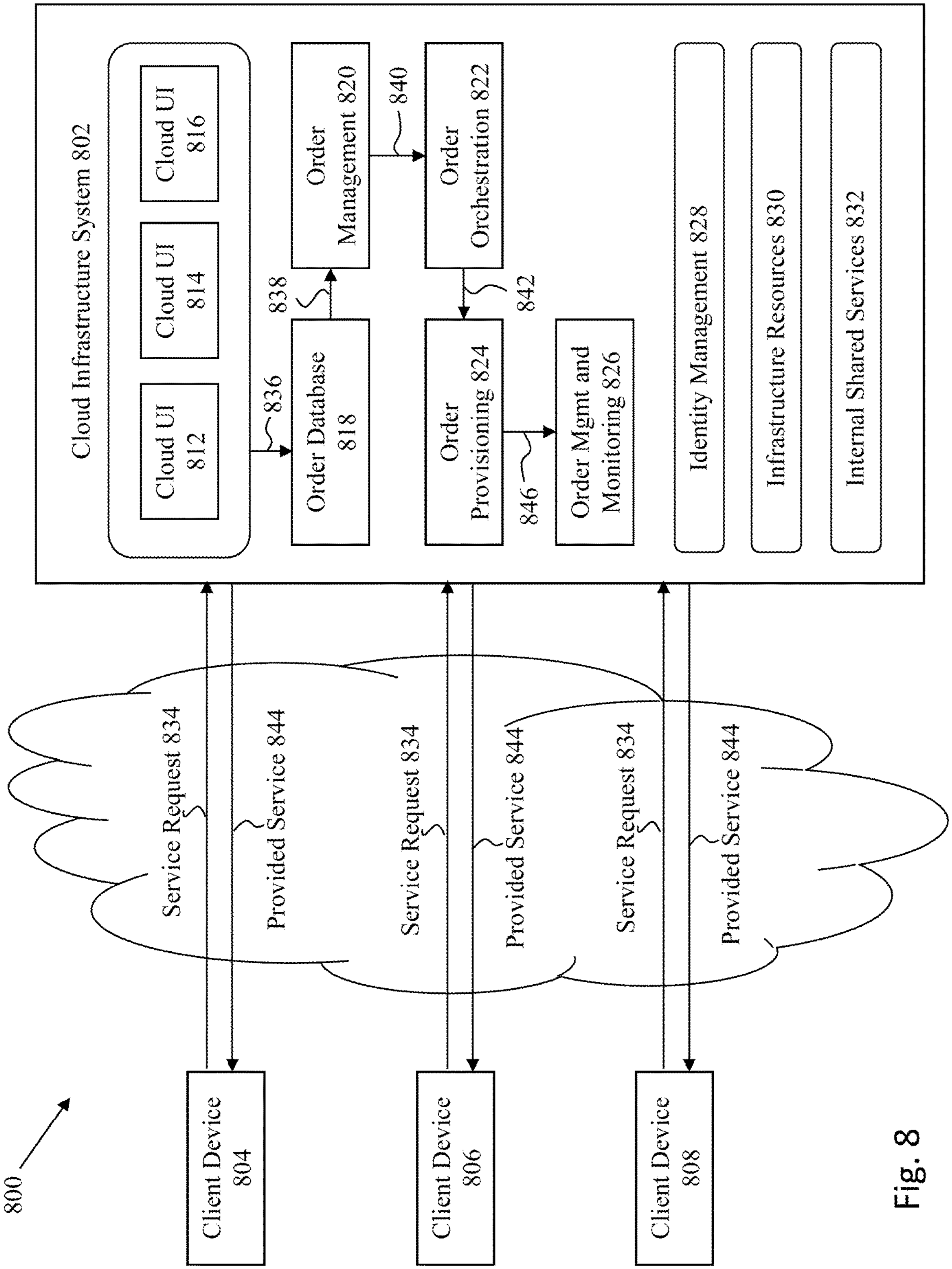
FIG. 8 is a block diagram of one or more components of a system environment by which services provided by one or more components of an embodiment system may be offered as cloud services, in accordance with an embodiment of the present disclosure.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 7. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a “service instance.” In general, any service made available to a user via a communication network, such as the Internet, from a cloud service provider’s system is referred to as a “cloud service.” Typically, in a public cloud environment, servers and systems that make up the cloud service provider’s system are different from the customer’s own on-premises servers and systems. For example, a cloud service provider’s system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor’s web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer’s subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer’s subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A computer-implemented method, comprising:

maintaining a plurality of nodes, wherein each node in the plurality of nodes includes node information for all nodes of the plurality of nodes, and the node information at each node of the plurality of nodes is used to self-determine a vice-leader node in a de-centralized manner at each node to produce a same consistent result across all nodes;

recording node information entries for the node information that is stored at each node of the plurality of nodes, the node information is respectively stored in first fields in respective memory for a data structure and further respectively corresponding to member nodes in a voting set, wherein the node information entries in the first fields in the respective memory are sorted according to one or more sorting criteria;

identifying a failure of a leader node from the plurality of nodes;

retrieving, from the memory, and evaluating at least one node information entry in a specific field of the first fields and evaluating the at least one node information entry in the specific field against one or more sorting criteria, wherein a first member node is selected as the vice-leader node; and responsive to a result of evaluating the node information entry, transmitting a first vote request from the vice-leader node via a network without waiting for a RAFT-imposed delay period; and transmitting a second vote request from another node via the network or a different network after waiting for the RAFT-imposed delay period;

wherein a new leader node is elected to continue workload processing by nodes within the plurality of nodes.

2. The method of claim 1, wherein a distributed copy of a member list is maintained at each member node of the member nodes, and a localized self-determination is performed by a given member node of the member nodes to determine whether the given node is selected as the vice-leader node, and the data structure in the memory comprises the first fields respectively storing the node information entries and further comprises second fields that respectively correspond to the first fields.

3. The method of claim 1, wherein each of the second fields respectively stores at least one criterion of the one or more sorting criteria for a corresponding member node of the member nodes, the data structure further comprises third fields that respectively store unique identifiers of the member nodes, and the unique identifiers are used to implement sorting of the member nodes.

4. The method of claim 1, wherein communication status information is maintained at each of the member nodes with respect to other nodes, and the communication status information is used to filter a member node from being considered to be the vice-leader.

5. The method of claim 4, wherein the communication status information corresponds to a channel status between nodes.

6. The method of claim 1, wherein a discriminant value is further used to select the first member node as the vice-leader node.

7. The method of claim 6, wherein the discriminant value comprises at least one of a central processing unit (CPU) value, a memory value, or a network value.

8. A computer program product embodied on a non-transitory computer readable medium, the computer readable medium having stored thereon a sequence of instructions which, when executed by a processor, executes:

maintaining a plurality of nodes, wherein each node in the plurality of nodes includes node information for all nodes of the plurality of nodes, and the node information at each node of the plurality of nodes is used to self-determine a vice-leader node in a de-centralized manner at each node to produce a same consistent result across all nodes;

recording node information entries for the node information that is stored at each node of the plurality of nodes, the node information is respectively stored in first fields in respective memory for a data structure and further respectively corresponding to member nodes in a voting set, wherein the node information entries in the first fields in the respective memory are sorted according to one or more sorting criteria;

identifying a failure of a leader node from the plurality of nodes;

retrieving, from the memory, and evaluating at least one node information entry in a specific field of the first fields and evaluating the at least one node information entry in the specific field against one or more sorting criteria, wherein a first member node is selected as the vice-leader node;

responsive to a result of evaluating the node information entry, transmitting a first vote request from the vice-leader node via a network without waiting for a RAFT-imposed delay period; and transmitting a second vote request from another node via the network or a different network after waiting for the RAFT-imposed delay period;

wherein a new leader node is elected to continue workload processing by nodes within the plurality of nodes.

9. The computer program product of claim 8, wherein a distributed copy of a member list is maintained at each member node of the member nodes, and a localized self-determination is performed by a given member node of the member nodes to determine whether the given node is selected as the vice-leader node, and the data structure in the memory comprises the first fields respectively storing the node information entries and further comprises second fields that respectively correspond to the first fields.

10. The computer program product of claim 8, wherein each of the second fields respectively stores at least one criterion of the one or more sorting criteria for a corresponding member node of the member nodes, the data structure further comprises third fields that respectively store unique identifiers of the member nodes, and the unique identifiers are used to implement sorting of the member nodes.

11. The computer program product of claim 8, wherein communication status information is maintained at each of the member nodes with respect to other nodes, and the communication status information is used to filter a member node from being considered to be the vice-leader.

12. The computer program product of claim 11, wherein the communication status information corresponds to a channel status between nodes.

13. The computer program product of claim 8, wherein a discriminant value is further used to select the first member node as the vice-leader node.

14. The computer program product of claim 13, wherein the discriminant value comprises at least one of a central processing unit (CPU) value, a memory value, or a network value.

15. A system, comprising:

a processor;

a memory for holding programmable code; and wherein the programmable code includes instructions which, when executed by the processor, cause the processor to perform a set of acts, the set of acts comprising:

recording node information entries, the node information entries for node information that is maintained at each node in a plurality of nodes, the node information at each node of the plurality of nodes is used to self-determine a vice-leader node in a de-centralized manner at each node to produce a same consistent result across all nodes; the node information entries respectively stored in first fields in memory for a data structure and further respectively corresponding to member nodes in a voting set, wherein the node information entries in the first fields in the respective memory are sorted according to a sorting criteria;

identifying a failure of a leader node from the plurality of nodes;

retrieving, from the memory, and evaluating at least one node information entry in a specific field of the first fields and evaluating the at least one node information entry in the specific field against one or more sorting criteria, wherein a first member node is selected as the vice-leader node; and responsive to a result of evaluating the node information entry, transmitting a first vote request from the vice-leader node via a network without waiting for a RAFT-imposed delay period; and transmitting a second vote request from another node via the network or a different network after waiting for the RAFT-imposed delay period;

wherein a new leader node is elected to continue workload processing by nodes within the plurality of nodes.

16. The system of claim 15, wherein a distributed copy of a member list is maintained at each member node of the member nodes, and a localized self-determination is performed by a given member node of the member nodes to determine whether the given node is selected as the vice-leader node, and the data structure in the memory comprises the first fields respectively storing the node information entries and further comprises second fields that respectively correspond to the first fields.

17. The system of claim 15, wherein each of the second fields respectively stores at least one criterion of the one or more sorting criteria for a corresponding member node of the member nodes, the data structure further comprises third fields that respectively store unique identifiers of the member nodes, and the unique identifiers are used to implement sorting of the member nodes.

18. The system of claim 15, wherein communication status information is maintained at each of the member nodes with respect to other nodes, and the communication status information is used to filter a member node from being considered to be the vice-leader.

19. The system of claim 18, wherein the communication status information corresponds to a channel status between nodes.

20. The system of claim 15, wherein a discriminant value is further used to select the first member node as the vice-leader node.

21. The system of claim 20, wherein the discriminant value comprises at least one of a central processing unit (CPU) value, a memory value, or a network value.

* * * * *